United States Patent
Shor et al.

(10) Patent No.: US 10,582,414 B2
(45) Date of Patent: Mar. 3, 2020

(54) METHOD AND SYSTEM FOR PROCESSING LOWER NFFT LTE RATES OVER CPRI LINK

(71) Applicant: FREESCALE SEMICONDUCTOR, INC., Austin, TX (US)

(72) Inventors: Roi M. Shor, Tel-Aviv (IL); Avraham Horn, Givat Shmuel (IL); Yael Rozin, Rannnana (IL)

(73) Assignee: NXP USA, Inc., Austin, TX (US)

(*) Notice: Subject to any disclaimer, the term of this patent is extended or adjusted under 35 U.S.C. 154(b) by 699 days.

(21) Appl. No.: 15/085,171

(22) Filed: Mar. 30, 2016

(65) Prior Publication Data

US 2017/0289842 A1   Oct. 5, 2017

(51) Int. Cl.
*H04W 28/02* (2009.01)
*H04W 88/08* (2009.01)

(52) U.S. Cl.
CPC ..... *H04W 28/0289* (2013.01); *H04W 88/085* (2013.01)

(58) Field of Classification Search
CPC ............ H04L 27/265; H04W 28/0289; H04W 72/0413; H04W 88/08; H04W 88/12
See application file for complete search history.

(56) References Cited

U.S. PATENT DOCUMENTS

| | | |
|---|---|---|
| 8,320,433 B2 | 11/2012 | Wegener |
| 2006/0256884 A1 | 11/2006 | Tomioka et al. |
| 2010/0246711 A1 | 9/2010 | Kishigami et al. |
| 2011/0249548 A1 | 10/2011 | Gaal et al. |
| 2012/0188961 A1 | 7/2012 | Suzuki et al. |
| 2012/0207206 A1* | 8/2012 | Samardzija ............. H03M 7/30 375/240 |
| 2012/0307743 A1 | 12/2012 | McGowan et al. |
| 2013/0114574 A1 | 5/2013 | Ng et al. |
| 2013/0165122 A1 | 6/2013 | Tanaka |
| 2013/0322336 A1* | 12/2013 | Cheng ..................... H04W 8/00 370/328 |
| 2014/0329553 A1 | 11/2014 | Nakashima et al. |

(Continued)

FOREIGN PATENT DOCUMENTS

| | | | |
|---|---|---|---|
| EP | 2099188 A2 | | 9/2009 |
| EP | 1811691 B1 | | 3/2012 |
| KR | 20150125037 A | * | 11/2015 |
| WO | 2012/109127 A1 | | 8/2012 |
| WO | WO2012164422 A1 | | 12/2012 |

OTHER PUBLICATIONS

U.S. Appl. No. 14/899,516, Inventor Vincent Martinez, "Radio Signal Decoding and Decoder", filed Dec. 17, 2015, Office Action—Notice of Allowance, dated Oct. 17, 2016.

(Continued)

*Primary Examiner* — Andrew Lai
*Assistant Examiner* — M Mostazir Rahman

(57) ABSTRACT

A method including receiving, by a radio equipment control (REC) device of a wireless communication system over an interface link, time domain compressed data from a radio equipment (RE) device at a first data transmission rate. The method further including transforming, by the REC device, the time domain compressed data to frequency domain decompressed full rate data for a second transmission data rate utilizing a Fast Fourier processing engine of the REC device.

8 Claims, 8 Drawing Sheets

(56) References Cited

U.S. PATENT DOCUMENTS

| | | | | |
|---|---|---|---|---|
| 2014/0376605 | A1* | 12/2014 | Kim | H03M 7/3062 375/240 |
| 2015/0156284 | A1* | 6/2015 | Akhter | H04L 69/04 370/477 |
| 2015/0382237 | A1* | 12/2015 | Kim | H04L 27/2636 370/210 |
| 2016/0128040 | A1 | 5/2016 | Shor et al. | |
| 2016/0156492 | A1 | 6/2016 | Martinez | |
| 2017/0237831 | A1* | 8/2017 | Yang | H04L 69/04 370/230 |
| 2017/0238361 | A1* | 8/2017 | Pawar | H04W 88/085 455/561 |
| 2018/0262206 | A1* | 9/2018 | Yun | H03M 7/70 |

OTHER PUBLICATIONS

Maiden; "Low-loss compression of CPRI baseband data"; EDN Network; Sep. 17, 2014; 12 pages.

3GPP TS 36.211: "Evolved Universal Terrestrial Radio Access (E-UTRA); Physical channels and modulation"; 105 pages.

3GPP TS 36.212: "Evolved Universal Terrestrial Radio Access (E-UTRA); Multiplexing and channel coding"; 63 pages.

3GPP TS 36.213: "Evolved Universal Terrestrial Radio Access (E-UTRA); Physical layer procedures"; 79 pages.

Non-Final Office Action dated Jun. 27, 2016 for U.S. Appl. No. 14/899,516.

Overview of 3GPP Release 10 V0.1.8 (Mar. 2013), http://www.3gpp.org/ftp/Information/WORK_PLAN/Description_Releases/.

Overview of 3GPP Release 11 V0.1.4 (Mar. 2013), http://www.3gpp.org/ftp/Information/WORK_PLAN/Description_Releases/.

Overview of 3GPP Release 12 Vo.08 (Mar. 2013), http://www.3gpp.org/ftp/Information/WORK_PLAN/Description_Releases/.

Overview of 3GPP Release 8 v0.2.10 (Mar. 2013), http://www.3gpp.org/ftp/Information/WORK_PLAN/Description_Releases/.

Overview of 3GPP Release 9 V0.2.9 (Mar. 2013), http://www.3gpp.org/ftp/Information/WORK_PLAN/Description_Releases/.

* cited by examiner

800

802 — REC Receives Frames Over Link From RE

804 — Deframer Deframes Frames and Stores Compressed Data at RX IQ MAC Buffer

806 — DMA Transfers Compressed Data at RX IQ MAC Buffer to RX IQ DMA Buffer

808 — DMA Transfers Time Domain Compressed Data at RX IQ DMA Buffer To Memory of eFTPE (TD)

810 — eFTPE Transforms Time Domain Compress Data to Frequency Domain Compressed Data at Compressed Rate Buffer (FD)

812 — Padding Module Pads Frequency Domain Compressed Data with Zeros and Transfers Frequency Domain Full Rate Data To Up-link Processing Module and iFFT

814 — Up-link Processing Module Processes Frequency Domain Full Rate Data

816 — iFFT Transforms Frequency Domain Full Rate Data to Time Domain at Decompressed Full Rate Buffer (TD)

818 — RACH Module Receives Time Domain Full Rate Data From Decompressed Full Rate Buffer (TD) and Processes Time Domain Full Rate Data

*FIG. 8*

METHOD AND SYSTEM FOR PROCESSING LOWER NFFT LTE RATES OVER CPRI LINK

FIELD OF THE DISCLOSURE

This disclosure generally relates to a method and system for processing lower communication rates over Common Public Radio Interface (CPRI) link.

BACKGROUND

Wireless base stations operate to provide communication for wireless user equipment devices over radio access networks of a wireless communication system. A radio access network is used by service providers to establish point-to-point communication paths, e.g., such as a communication between two smart phones, a smart phone and a data server, and the like. A wireless communication system has a wireless base station, and antennas that are used to facilitate the point-to-point communication paths defined by the service providers. The wireless base station operates in conjunction with the antennas to communicate with the wireless user equipment devices, such as smart phones, which transmits and receives signals over the antennas.

A typical wireless base station has a radio equipment control (REC) device, a radio equipment device, and one or more antennas. During operation, the REC and RE communicate with each other over an interface link at a particular data transmission link rate. Communicating over a single interface link at this link rate can become a bottleneck when data for multiple antennas are multiplexed over this single interface link. For example, at a link rate of approximately 9.8 GHz, only 8 antenna carriers can be multiplexed over a CPRI interface link when all 8 antenna carriers utilize a 20 MHz bandwidth and a 15 bit sampling width.

BRIEF DESCRIPTION OF THE DRAWINGS

The present disclosure may be better understood, and its numerous features and advantages made apparent to those skilled in the art by referencing the accompanying drawings.

FIG. 8 illustrates another method of data processing by a radio equipment control device in an up-link direction, in accordance with at least one embodiment of the present disclosure.

The use of the same reference symbols in different drawings indicates similar or identical items.

DETAILED DESCRIPTION OF THE DRAWINGS

Figure 1:
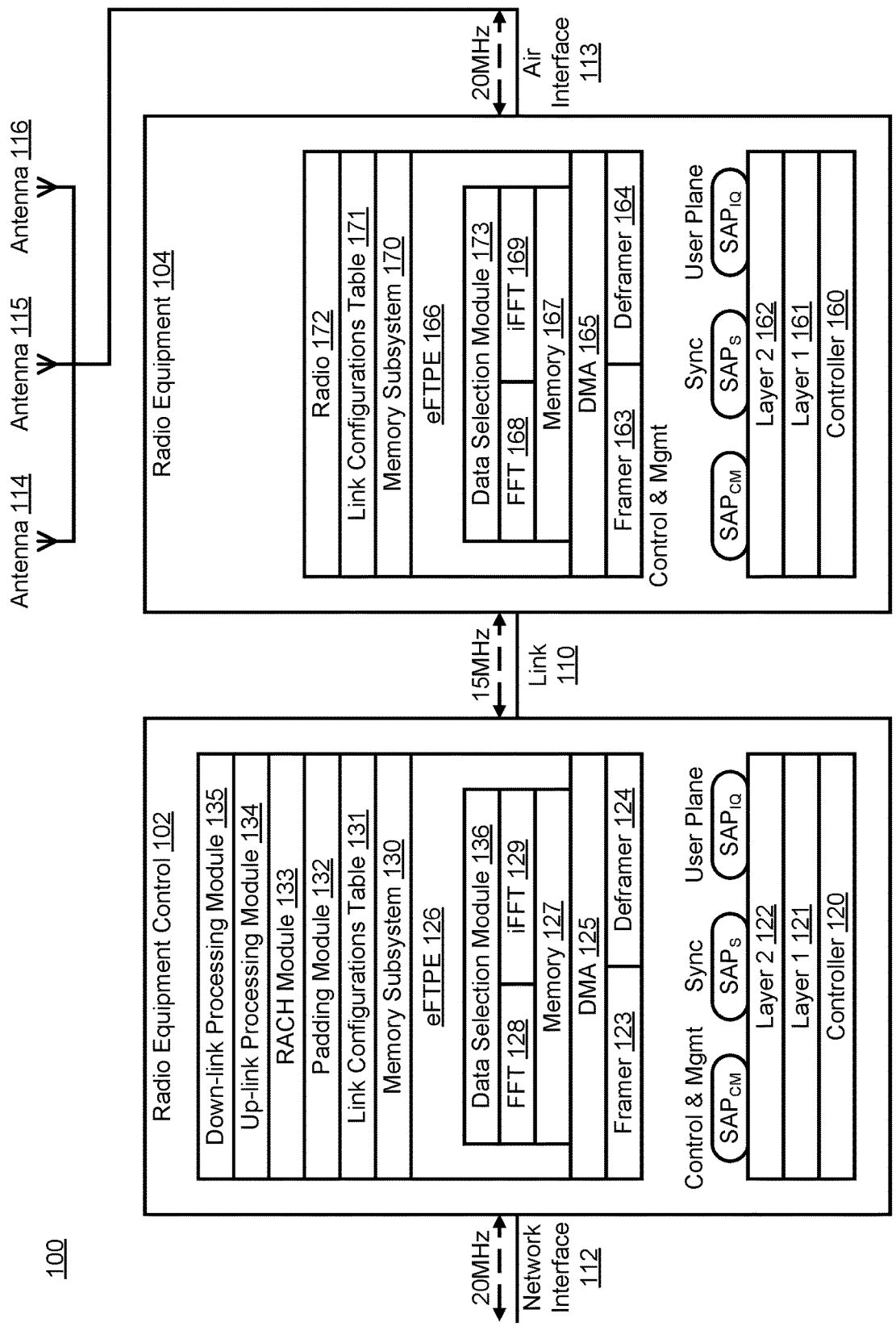
FIG. 1 is a block diagram illustrating a wireless communication system, in accordance with at least one embodiment of the present disclosure.

An embodiment of a wireless communication system is disclosed that includes a radio equipment control (REC) device and a radio equipment (RE) device. The REC device communicates with a radio access network of the wireless communication system via a radio access network interface. Information over the radio access network interface is provided by various service providers, also referred herein as carriers and network carriers, at a particular data transmission network interface rate. The REC device and the RE device communicate with each other over an interface link and the RE device communicates with one or more wireless user equipment units via an air interface which transmits and receives signals over one or more antennas, where the communication between the REC device and the RE device is at a data transmission link rate. The particular data transmission network interface rate can be higher than the particular data transmission link rate to improve the performance of communication of the wireless communication system. For example, the particular data transmission network interface rate can be 20 MHz for communication of data, referred herein as full rate data, over the network interface and the particular data transmission link rate can be 15 MHz for communication of compressed data over the link. During operation, the REC device can utilize a fast Fourier transformation module of a fast Fourier processing engine to transform full rate data to compressed data for communication over the link to the RE device. Similarly, the REC device can utilize an inverse fast Fourier transformation module of the fast Fourier processing engine to transform compressed data received over the link from the RE device to full rate data. In this manner, the REC enables compressed data rates to be utilized for higher link efficiency while maintaining full rate data rates for network interface communication.

Thus, during operation, the REC device can receive compressed data at a compressed data rate, e.g., a 15 MHz data rate, over the interface link from the RE device in the up-link direction, where the compressed data is time domain data. A Fourier Transform Processing Engine (FTPE) of the REC device transforms the time domain compressed data to the frequency domain compressed data utilizing a Fast Fourier Transformation (FFT) module. A padding module transforms the frequency domain compressed data to frequency domain decompressed full rate data by padding the compressed data with zeros, e.g., assigning zeros to the higher frequency domain values. This frequency domain decompressed full rate data is provided to an up-link processing module and a Random Access Channel (RACH) module. The up-link processing module processes the frequency domain decompressed full rate data. In parallel, the FTPE can transform the frequency domain decompressed full rate data to an uncompressed time domain signal utilizing an inverse Fast Fourier Transformation (iFFT) module, wherein the uncompressed time domain signal is used for RACH processing by the RACH module.

The REC device can also receive data from a down-link processing module, where the received data is frequency domain data for a full data rate. The REC device transforms the frequency domain full rate data to compressed data by sampling the portions of the frequency domain signal needed to support a 15 MHz data rate. For example, the sampling can be performed by using only the initial samples of the frequency domain full rate data received at a 20 MHz data rate that are required for communication at a 15 MHz data rate. The FTPE device transforms the frequency domain compressed data to the time domain by utilizing the iFFT module. The REC device then transmits the compressed data over the interface link to the RE device at the compressed data rate. When the compressed data is received, the RE device can decompress the received data in the same manner as does the REC, described above, and transmit the decompressed time domain data over the air interface via the antennas to the user equipment devices at the particular full data rate, i.e., the 20 MHz rate.

FIG. 1 illustrates a wireless communication system 100 in accordance with a specific embodiment. Examples of a wireless communication system includes one or more of an Universal Mobile Telecommunications System (UMTS), an evolved UMTS Terrestrial Radio Access (E_UTRA) system, a Worldwide Interoperability for Microwave Access (WiMAX) system, a WiMAX advanced system, a Global System for Mobile (GSM) system, a Code Division Multiple Access (CDMA) system, a wideband code division multiple access (WCDMA) system a Time Division Multiple Access (TDMA) system, a Long Term Evolution (LTE) system, a Long Term Evolution Advanced (LTE-A) system, and the like, as appropriate for the application. In particular, the wireless communication system 100 includes a radio equipment control (REC) device 102 and a radio equipment (RE) device 104. REC 102 provides the radio functions of the digital baseband domain including the radio access network interface transport, transmit/receive of information between REC 102 and RE 104, the radio base station control and management, and the digital baseband processing. RE 104 provides the analogue and radio frequency functions including filtering, modulation, frequency conversion, and amplification. In an embodiment, wireless communication system 100 includes a chain of REC devices coupled to a chain of RE devices.

REC 102 communicates with a radio access network of the wireless communication system (not illustrated) via a radio access network interface 112. Information over radio access network interface 112 is provided by a service provider, also referred herein as a carrier and a network carrier. REC 102 can also communicate with additional radio access networks and service providers as needed or desired.

REC 102 communicates with RE 104 via a communications link 110. Link 110 is a point-to-point interface that provides a digital connection between REC 102 and RE 104. Link 110 may be a Common Public Radio Interface (CPRI) link as described in the Common Public Interface Specification, referred herein as the CPRI specification, an Open Base Station Architecture Initiative (OBSAI) interface link as described in the Open Base Station Architecture Initiative BTS System Reference Document, and the like. Link 110 may communicate using Ethernet protocol, High-level Data Link Control (HDLC) protocol, Layer 1 In band (L1 In band) protocol, and the like.

RE 104 communicates with a wireless user equipment unit (not shown) via an air interface 113 which transmits and receives signals over one or more antennas 114, 115, and 116. Examples of a wireless user equipment unit are a mobile station such as a mobile telephone, a wearable device such as a smart watch, a wireless robot, a laptop with mobile termination, an automobile telephone, a fixed wireless device, and the like, which can communicate voice, video, data, programs/program instructions, and the like with a radio access network. RE 104 can also communicate with additional wireless user equipment units as needed or desired.

REC 102 includes a controller 120, a layer 1 interface 121 connected to link 110, a layer 2 interface 122, a Service Access Point (SAP$_{CM}$) for control and management, a service access point (SAP$_S$) for synchronization, a service access point (IQ) data (SAP$_{IQ}$) for In-Phase and Quadrature, a framer 123, a deframer 124, a Direct Memory Access (DMA) 125, an enhanced Fourier Transform Processing Engine (eFTPE) 126 having a memory 127, a Fast Fourier Transformation (FFT) module 128, an inverse Fast Fourier Transformation (iFFT) module 129, and a data selection module 136, a memory subsystem 130, a link configurations table 131, a padding module 132, a Random Access Channel (RACH) module 133, a up-link processing module 134, and a down-link processing module 135.

eFTPE 126 utilizes FFT module 128 to transform data from the time domain to the frequency domain. Similarly, eFTPE 126 utilizes iFFT module 129 to transform data from the frequency domain to the time domain. In accordance with a particular embodiment, REC 102 utilizes padding module 134 to transform compressed rate data frequency domain data to full rate frequency domain data by padding the compressed frequency domain data with zeros, to generate the full rate data. eFTPE 126 utilizes data selection module 136 to transform full rate data to compressed data by using only using only a lower frequency portion of the frequency domain data, where data selection module 136 performs data selection similar to the inverse of padding performed by padding module 134.

An exemplary table of various sampling rates for Evolved Universal Mobile Telecommunications System (UMTS) Terrestrial Radio Access (E-UTRA) and interface link rates, e.g., a CPRI interface link described in the CPRI specification, version v6.x, is provided below:

TABLE 1

| Sampling Rates | | | | | | |
|---|---|---|---|---|---|---|
| Channel Bandwidth (MHz) | 1.4 | 3 | 5 | 10 | 15 | 20 |
| Number of Subcarriers Downlink | 73 | 181 | 301 | 601 | 901 | 1201 |
| NFFT | 128 | 256 | 512 | 1024 | 1536, 1024 | 2048, 1536 |
| Sampling Rate (MHz) | 1.92 | 3.84 | 7.68 | 15.36 | 23.04, 15.36 | 30.72, 23.04 |
| Sampling Rate/UMTS Chip Rate | ½ | 1 | 2 | 4 | 6, 4 | 8, 6 |

The above exemplary table, Table 1, shows the various sampling rates and interface link rates for the LTE and LTE-A protocols, where there are 0.5, 1, 2, 4, 6, or 8 LTE samples in every data transmission for each channel bandwidth given in columns 2-7. More specifically, row 1 of table 1 includes the various channel bandwidths represented by "1.4" MHz, "3" MHz, "5" MHz, "10" MHz, "15" MHz, and "20" MHz. Row 2 includes the number of subcarriers in the downlink for each channel bandwidth, represented by "73", "181", "301", "601", "901", and "1,201", respectively.

Row 3 includes the Number of FFT (NFFT) samples in each data transmission over link 110 for each channel bandwidth, represented by "128", "256", "512", "1024", "1536, 1024", and "2048, 1536", respectively. The NFFT entry at row 3, column 6 includes the number of full data rate samples in each data transmission, "1536", and the number of compressed data rate samples in each data transmission, "1024". Similarly, the NFFT entry at row 3, column 7 includes the number of full data rate samples in each data transmission, "2048", and the number of compressed data rate samples in each data transmission, "1536". Row 4 includes the natural sampling rates that each data transmission is transmitted at over link 110, represented by "1.92" MHz, "3.84" MHz, "7.68" MHz, "15.36" MHz, "23.04, 15.36" MHz, and "30.72, 23.04" MHz, respectively.

The sampling rate at row 4, column 6 indicates that one of two data rates are possible, including a full rate data sampling rate, "23.04" MHz, and the compressed rate data sampling rate, "15.36". Similarly, the sampling rate at row 4, column 7 includes the full rate data sampling rate, "30.72" MHz, and the compressed rate data sampling rate, "23.04" MHz. Each data transmission is transmitted over link 110 at a natural sampling rates, where the natural sampling rates are multiples of chip rate, e.g., 3.84 Mbps for a Wideband Code-Division Multiple Access (WCDMA) sampling rate and a natural sampling rate of i*3.84 Mbps. Row 5 includes the number of samples in each data transmission over link 110, the sampling rate divided by the Universal Mobile Telecommunications System (UMTS) chip rate, represented by "½", "1", "2", "4", "6, 4", and "8, 6". The number of samples in each data transmission at row 5, column 6 includes the full rate data sampling rate of 6, and the compressed rate data sampling rate of 4. Similarly, the number of samples in each data transmission at row 5, column 7 includes the full rate data sampling rate of 8, and the compressed rate data sampling rate 6.

As shown in table 1, compressed data rates are supported for 15 MHz and 20 MHz in CPRI version v6.x and beyond. However, CPRI version v6.x does not define how to achieve the compressed data rates. In earlier implementations, e.g., CPRI version v4.x, compressed data rates are not supported. Embodiments of the present invention support compressed data rates in CPRI version v4.x implementations and utilizes CPRI v4.x IP and the FFT/iFFT modules to accommodate for the lack of compressed data support. As such, with some extra cost of complexity of RE device 104 filtering performed by REC device 102, described in further detail below, the values for 15 MHz and 20 MHz can be utilized when a higher link 110 efficiency is required. In an embodiment, REC 102 can be a fully compliant CPRI version v6.x implementation that can be configured during a configuration process to operate with a CPRI version v4.x implementation of RE 104 that may or may not fully support data compression or a CPRI version v6.x implementation of RE 104. In another embodiment, REC 102 can be a CPRI version v4.x implementation that additionally supports compressed data rates and can be configured to operate with a CPRI version v4.x implementation of RE 104 of the present application or a CPRI version v6.x implementation of RE 104 that fully supports the compressed data rates of the CPRI version v6.x specification. RE 104 can also support compressed data rates in version v4.x implementations in a similar manner as REC 102. The various number entries of exemplary table, Table 1, are examples only and other numbers can also be supported by the full data rates and compression rates transformation techniques of the present application.

Controller 120 performs a configuration process to implement a link configuration based on various configuration information stored at link configurations table 131. During an initialization process, a specific link configurations table entry can be utilized by REC 102 and RE 104 to establish communication over link 110.

Link configurations table 131 includes information identifying various configurations of link 110 that are capable of being supported by REC 102. During an auto-negotiation process as described in the CPRI specification, controller 120 of REC 102 utilizes the information in link configurations table 131 to identify various link configurations that are supported by both REC 102 and RE 104. In an embodiment, controller 120 configures link configurations table 131 during a configuration process prior to bringing link 110 into operation. For example, according to an embodiment, controller 120 configures link configurations table 131 during a reset, a restart, an initialization, an update process, and the like.

Three different information flows (protocol data planes) are multiplexed over link 110 including data flows of user plane data, control and management plane data, and synchronization plane data. The control plane (control data flow) is used for point-to-point communication processing; the management plane (management data flow) data is management information for the operation, administration and maintenance of link 110, REC 102, and RE 104; the user plane (user data flow) data (IQ data) includes antenna carrier data that has to be transferred from wireless communication system 100 to the user equipment devices, e.g., a mobile phone user, and visa versa, and the synchronization data flow transfers synchronization and timing information between REC 102 and RE 104. In addition to the user plane data, control and management (C&M) control signals as well as synchronization control signals are exchanged between REC 102 and RE 104. All information flows or "planes", including both control and user data, are multiplexed onto link 110 using layer 1 interface 121 and layer 2 interface 122 protocols via the appropriate service access points (SAP-S).

Layer 1 interface 121 is a physical layer interface that performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 122 is a data link layer that provides flexibility and scalability for providing different layer 2 protocols. For example, the data link layer may implement a High-level Data Link Control (HDLC) slow control and management channel, an Ethernet fast control and management channel, and a vendor specific (VSS) control and management channel. Layer 2 interface 122 may further provide media access control, flow control, and data protection of the control and management information flow over link 110 via REC 102. Layer 2 service access points (SAP-S) are defined for the information planes or data flows and are denoted as $SAP_{CM}$, $SAP_S$, and $SAP_{IQ}$ of REC 102. $SAP_{CM}$, $SAP_S$, and $SAP_{IQ}$ are defined on a per link basis, where for a given link, $SAP_{CM}$ is mapped to receive an information flow of control plane data and management plane data for that link, $SAP_S$ is mapped to an information flow of synchronization plane data for that link, and $SAP_{IQ}$ is mapped to an information flow of user plane data based on IQ complex data for that link.

Framer 123 multiplexes multiple data for multiple antenna carriers into frames for transmission over link 110 to RE 104. Frames received by REC 102 from RE 104 are provided to a deframer 124, which de-multiplexes multiple data, as well as other data flow, control and management, and layer 1 interface 121 timing and maintenance information from the frames and distributes to the appropriate SAP. DMA 125 allows the bidirectional transfer of data over link 110 in an efficient manner.

RE 104 includes a controller 160, a layer 1 interface 161 connected to link 110, a layer 2 interface 162, a Service Access Point ($SAP_{CM}$) for control and management, a service access point ($SAP_S$) for synchronization, a service access point (IQ) data ($SAP_{IQ}$) for In-Phase and Quadrature, a framer 163, a deframer 164, a Direct Memory Access (DMA) 165, an enhanced Fourier Transform Processing Engine (eFTPE) 166 having a memory 167, a Fast Fourier Transformation (FFT) module 168, an inverse Fast Fourier Transform (iFFT) module 169, and a data selection module 173, a memory subsystem 170, a link configurations table 171, and a radio 172. The FFT and iFFT functions are performed by the FFT module 168 and iFFT module 169 of eFTPE 166, respectively.

Controller 160 performs a configuration process of link 110 that is initiated by REC 102 to determine and implement a link configuration, which as previously discussed, is based on a specific link configurations table entry of link configurations table 171.

Link configurations table 171 provides similar functionality as link configurations table 131 and includes link configurations information including various link configurations of link 110 that are supported by RE 104. Controller 160 utilizes the information in link configurations table 171 during the auto-negotiation between REC 102 and RE 104 to determine the link configuration of link 110 that both REC 102 and RE 104 support. In an embodiment, controller 160 configures link configurations table 171 during a configuration process prior to bringing link 110 into operation. In another embodiment, controller 160 configures link configurations table 171 during a reset, a restart, an initialization, an update process, and the like.

Layer 1 interface 161 is a physical layer interface that provides similar functionality as layer 1 interface 121 and performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 162 provides similar functionality as layer 2 interface 122 and provides RE 104 access to the different information flows via service access points $SAP_{CM}$, $SAP_S$, and $SAP_{IQ}$ of RE 104 which correspond to service access points $SAP_{CM}$, $SAP_S$, and $SAP_{IQ}$ of REC 102, respectively. $SAP_{CM}$, $SAP_S$, and $SAP_{IQ}$ of RE 104 provide similar functionality as $SAP_{CM}$, $SAP_S$, and $SAP_{IQ}$ of REC 102.

Framer 163 provides similar functionality as framer 123 and multiplexes data flow information received from radio 172, control and management information, synchronization information, and layer 1 interface 161 information into frames for transmission over link 110 to REC 102. Deframer 164 provides similar functionality as deframer 124. Frames received from REC 102 are provided to deframer 164, which de-multiplexes multiple data, as well as other data flow, control and management, and layer 1 interface 161 timing and maintenance information from the frames and distributes to the appropriate SAP for forwarding to radio 172 for transmission to user equipment. DMA 165 allows the bidirectional transfer of data over link 110 in an efficient manner.

During operation, REC 102 can receive data over network interface 112 from the radio access network of the cellular communications system at a full data rate, e.g., a 20 MHz data rate. REC 102 can then compress the received data and transmit the compressed data over link 110 to RE 104 at the compressed data rate, e.g., a 15 MHz data rate. When the compressed data is received, RE 104 can decompress the received data and transmit the decompressed data over air interface 113 and one or more of antennas 114, 115, and 116, to the user equipment device at a full data rate, e.g., at the 20 Mhz rate, as described in greater detail below.

Figure 2:
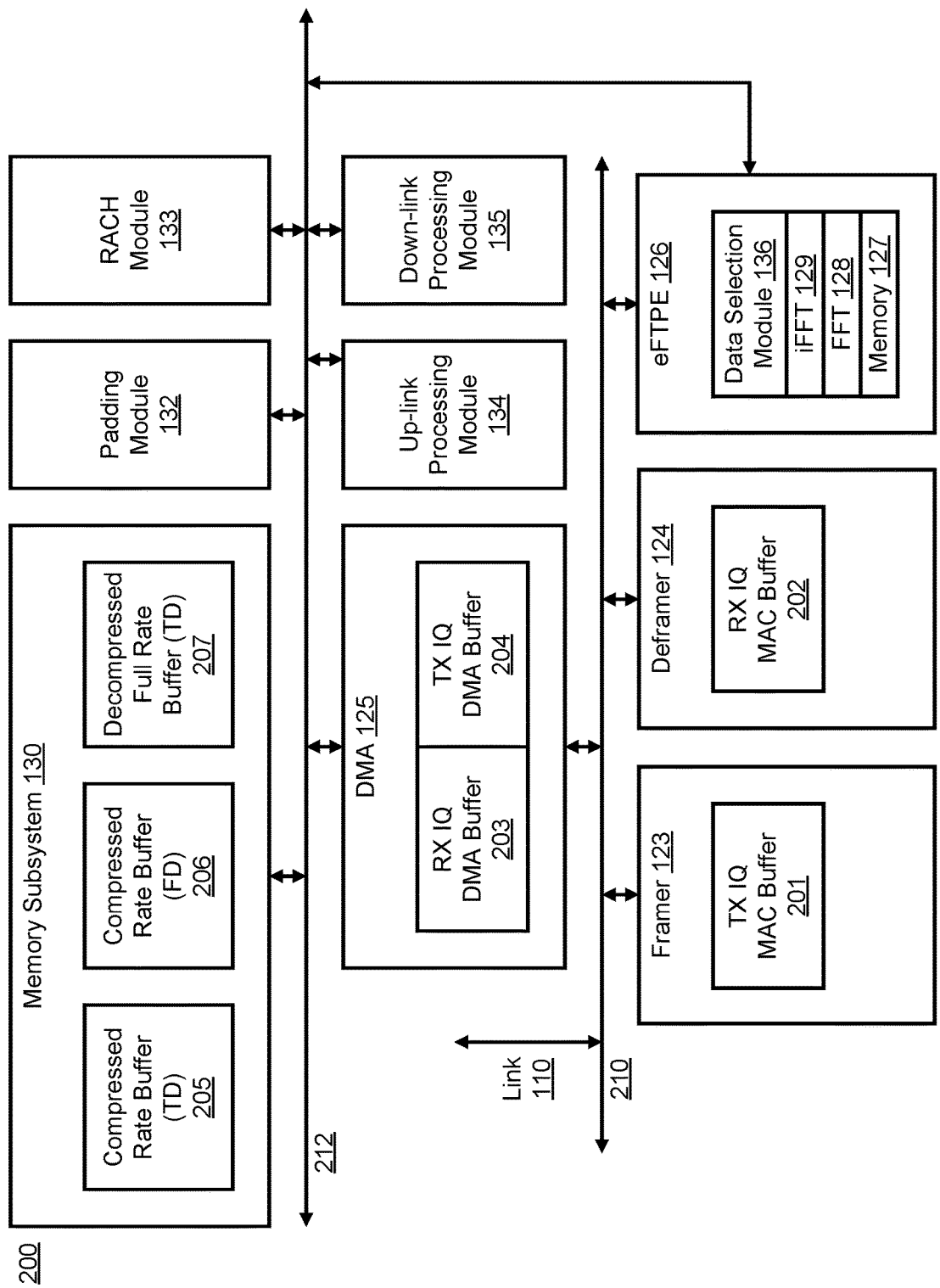
FIG. 2 is a block diagram illustrating the radio equipment control device of FIG. 1 in more detail, in accordance with at least one embodiment of the present disclosure.

FIG. 2 is a block diagram 200 illustrating a portion of REC 102 in more detail, in accordance with a specific embodiment. Framer 123 includes a transmit (TX) IQ MAC buffer 201, deframer 124 includes a receive (RX) IQ MAC buffer 202, DMA 125 includes a receive (RX) IQ DMA buffer 203 and a transmit (TX) IQ DMA buffer 204, and memory subsystem 130 includes a compressed rate buffer 205 for data in the time domain (TD), a compressed rate buffer 206 for data in the frequency domain (FD), and a decompressed full rate buffer 207 for data in the time domain. Framer 123, deframer 124, eFTPE 126, and DMA 125 communicate with each other via interconnect 210, and framer 123 and deframer 124 communicate with RE 104 via link 110. eFTPE 126, DMA 125, up-link processing module 134, down-link processing module 135, padding module 132, and RACH module 133 communicate with memory subsystem 130 and each other via interconnect 212. REC 102 can be utilized for data processing in both the up-link and down-link directions, as described in further detail below.

Figure 3:
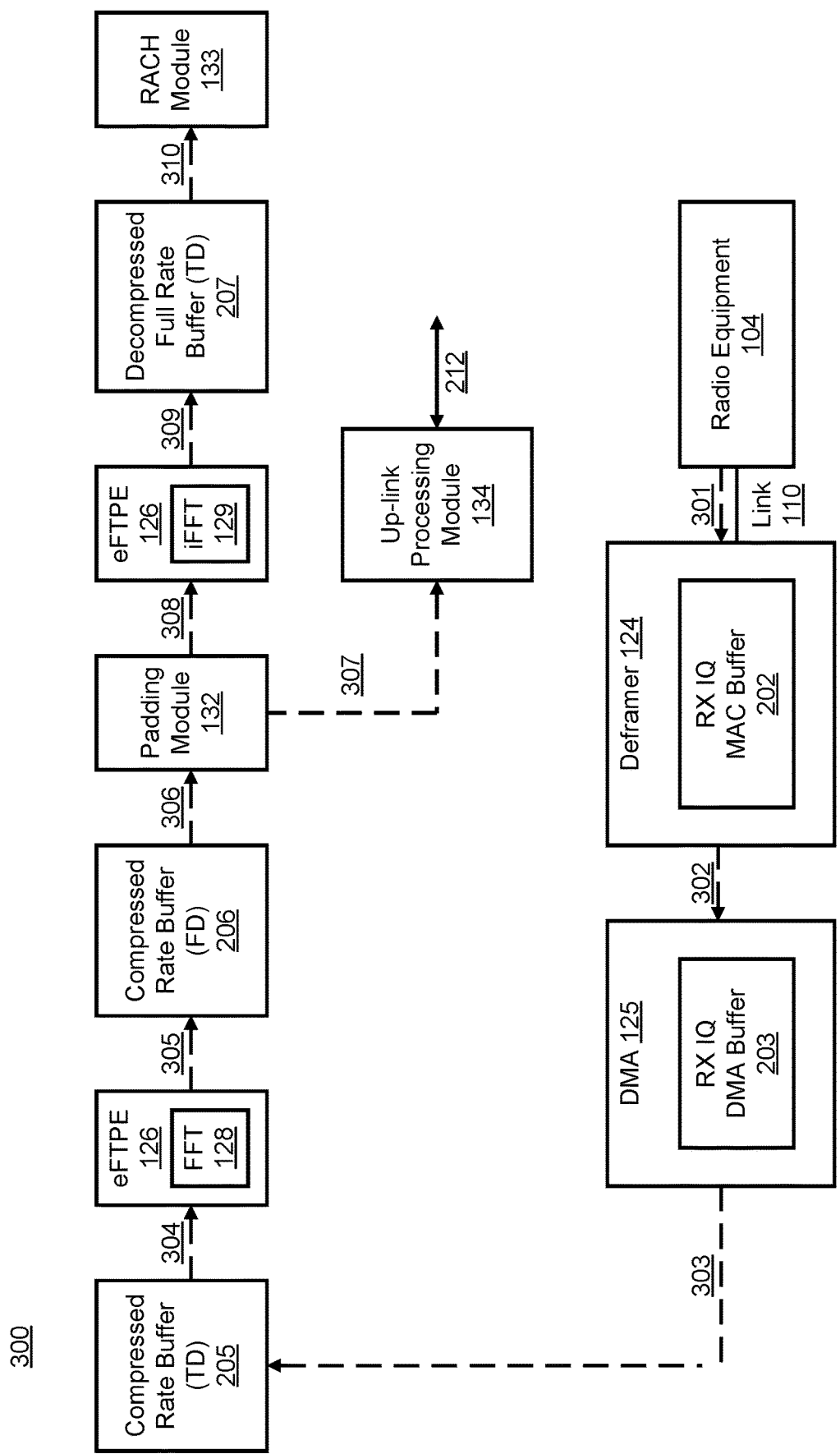
FIG. 3 is a flow diagram of data processing by the radio equipment control device of FIG. 1 in an up-link direction, in accordance with at least one embodiment of the present disclosure.

FIG. 3 includes a block diagram 300 that shows a particular data flow of data processing by a portion of REC 102 in an up-link direction, in accordance with a specific embodiment. As shown, deframer 124 receives frames of compressed data at the compressed data rate over link 110 from RE 104 in the up-link direction, as indicated by the dashed arrow 301. The frames of compressed data are de-multiplexed by deframer 124 and the de-multiplexed compressed data is stored at RX IQ MAC buffer 202. Deframer 124 provides the compressed data to DMA 125, as indicated by the dashed arrow 302, which stores the compressed data at RX IQ DMA buffer 203. DMA 125 then stores the time domain compressed data at compressed rate buffer 205 of memory subsystem 130, as indicated by the dashed arrow 303. Note, the designators TD and FD in FIG. 3 indicate whether information is time domain information or frequency domain information, respectively. The time domain compressed data stored at compressed rate buffer 205 is provided to the eFTPE 126, as indicated by the dashed arrow 304. The eFTPE 126 transforms the time domain compressed data to the frequency domain utilizing the FFT module 128, and stores the frequency domain compressed data at compressed rate buffer 206, as indicated by the dashed arrow 305.

Padding module 132 accesses the frequency domain compressed data stored at compressed rate buffer 206, as indicated by the dashed arrow 306, and transforms the frequency domain compressed data to frequency domain decompressed full rate data by padding the end of the stream of compressed data with zeros to provide the frequency domain decompressed full rate data to up-link processing module 134 and eFTPE 126, as indicated by the dashed arrows 307 and 308, respectively. For example, if there are N samples within the stream of compressed data ($X_0, \ldots, X_{N-1}$) and there are M samples within the stream of decompressed full rate data, the compressed data is padded with M-N zeros at the end (X0, ..., XN-1, 0, ..., 0). Up-link processing module 134 processes the frequency domain decompressed full rate data in a normal manner to provide information to network interface 212. In parallel, eFTPE 126 performs another sequential transformation to transform the frequency domain decompressed full rate data to the time domain utilizing the iFFT module 129, and stores the time domain decompressed full rate data at decompressed full rate buffer 207, as indicated by the dashed arrow 309. RACH module 133 accesses the time domain decompressed full rate data at decompressed full rate buffer 207, as indicated by the dashed arrow 310, for further RACH processing. An additional delay of REC 102 execution is introduced only in the RACH processing. As the RACH processing only has a small dependence on the other processes of REC 102, the delay can be absorbed by the system.

Figure 4:
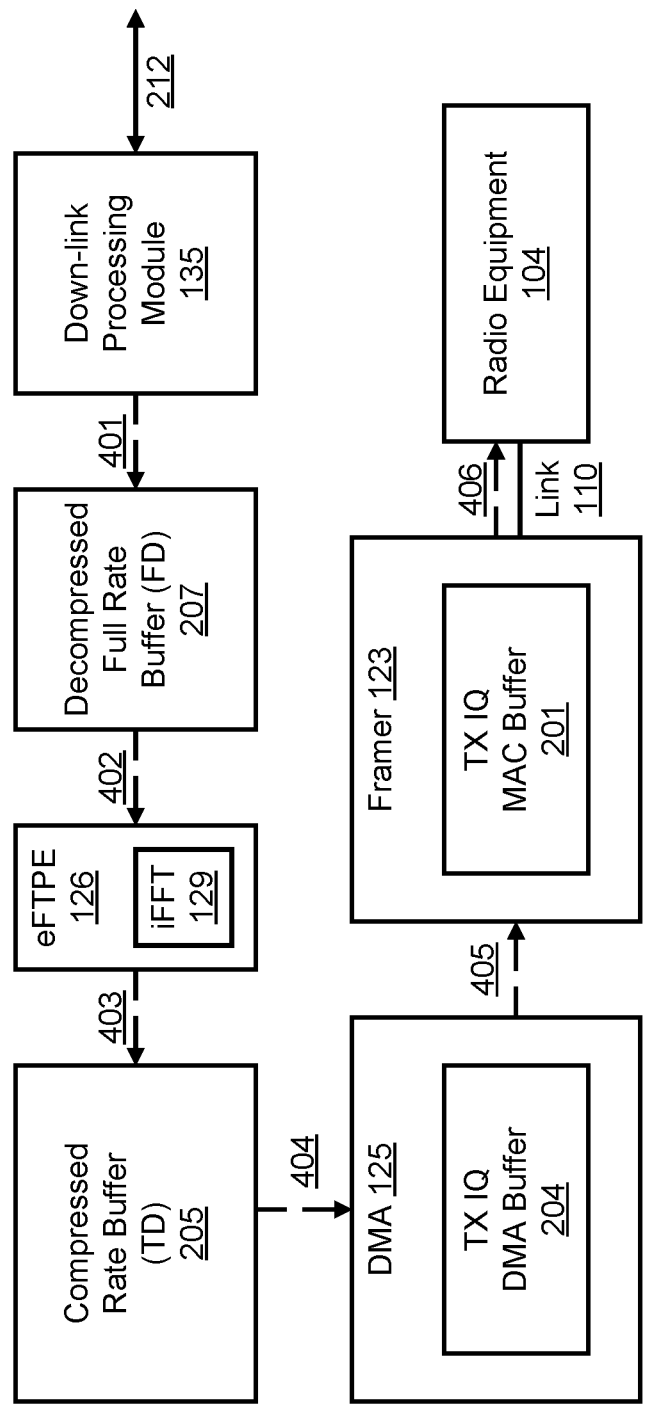
FIG. 4 is a flow diagram of data processing by the radio equipment control device of FIG. 1 in a down-link direction, in accordance with at least one embodiment of the present disclosure.

FIG. 4 includes a block diagram 400 that shows a particular data flow of data processing by a portion of REC 102 in a down-link direction, in accordance with a specific embodiment. Down-link processing module 135 processes information received from network 212 in a normal manner and stores frequency domain decompressed full rate data at decompressed full rate buffer 207, as indicated by the dashed arrow 401. eFTPE 126 accesses the frequency domain decompressed full rate data at decompressed full rate buffer 207, as indicated by the dashed arrow 402, transforms a portion of the frequency domain decompressed full rate data to the time domain utilizing the iFFT module 129, to generate time domain compressed rate data. eFTPE 126 then stores the time domain compressed rate data at time domain compressed rate buffer 205, as indicated by the dashed arrow 403. DMA 125 accesses the time domain compressed rate data at time domain compressed rate buffer 205, as indicated by the dashed arrow 404, and stores the time domain compressed rate data at TX IQ DMA buffer 204. DMA 125 then provides the time domain compressed rate data to framer 123, as indicated by the dashed arrow 405. Framer 123 multiplexes the time domain compressed rate data into frames of time domain compressed rate data and stores the frames at TX IQ MAC buffer 201. REC 102 transmits the frames of time domain compressed rate data to RE 104 at the compressed data rate over link 110 in the down-link direction, as indicated by the dashed arrow 406.

Figure 5:
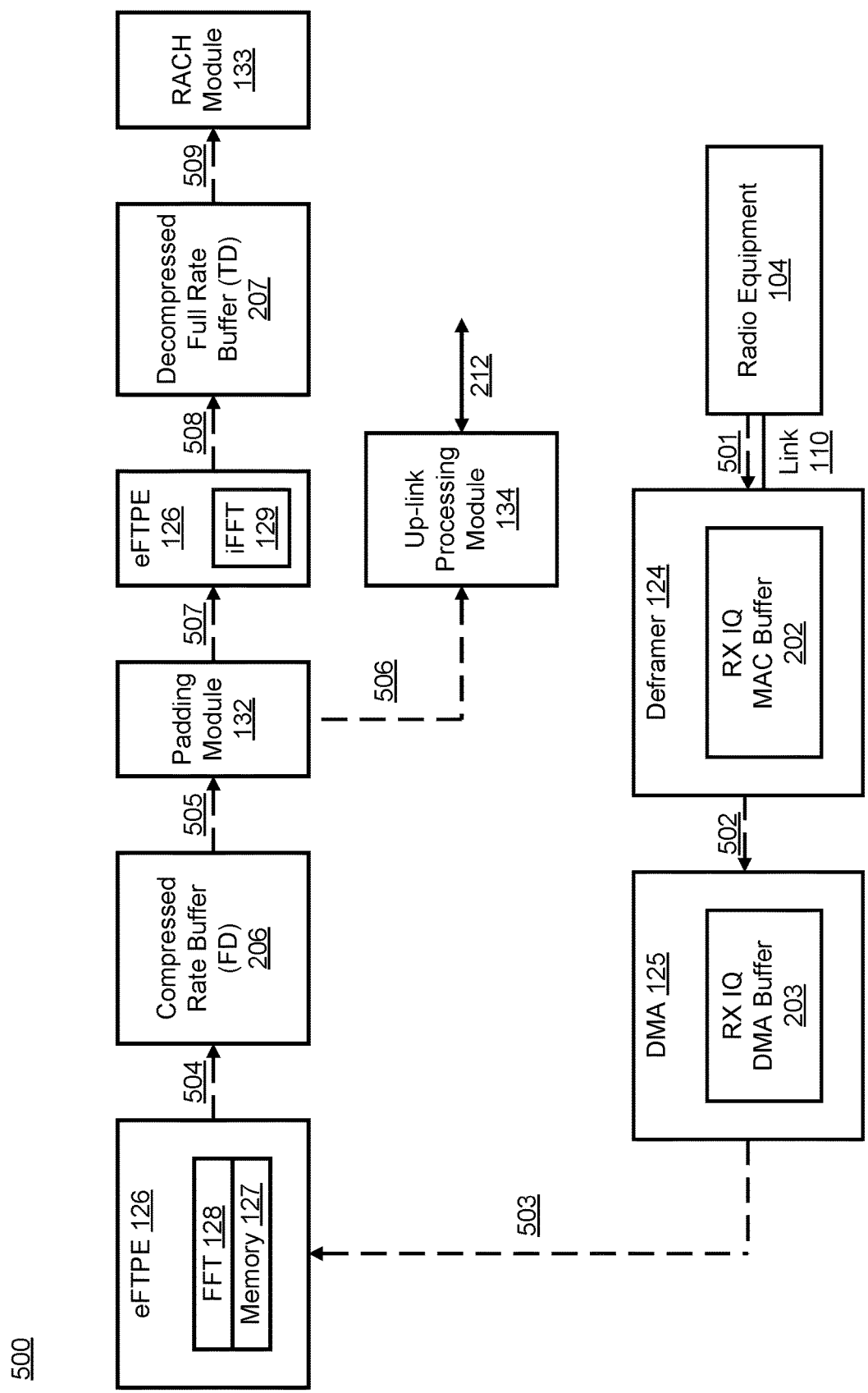
FIG. 5 is another flow diagram of data processing by the radio equipment control device of FIG. 1 in an up-link direction, in accordance with at least one embodiment of the present disclosure.

FIG. 5 includes a block diagram 500 that shows another data flow of data processing by a portion of REC 102 in an up-link direction that reduces memory consumption and system bus loads for improved throughput, in accordance with a specific embodiment. As shown, REC 102 receives frames of compressed data at the compressed data rate over link 110 from RE 104 in the up-link direction, as indicated by the dashed arrow 501. The frames of compressed data are de-multiplexed by deframer 124 and the de-multiplexed compressed data is stored at RX IQ MAC buffer 202. Deframer 124 then provides the compressed data to DMA 125, as indicated by the dashed arrow 502, which stores the compressed data at RX IQ DMA buffer 203. DMA 125 then directly provides the time domain compressed data at memory 127 of eFTPE 126, as indicated by the dashed arrow 503, by-passing compressed rate buffer 205, as previously described. By adding the direct write capability from link 110 to eFPTE 126, the memory consumption and system bus loads are reduced and data processing throughput is improved. eFTPE 126 transforms the time domain compressed data stored at memory 127 to the frequency domain utilizing the FFT module 128, and stores the frequency domain compressed data at compressed rate buffer 206, as indicated by the dashed arrow 505.

Padding module 132 accesses the frequency domain compressed data stored at compressed rate buffer 206, as indicated by the dashed arrow 505, transforms the frequency domain compressed data to frequency domain decompressed full rate data by padding the compressed data with zeros, and provides the frequency domain decompressed full rate data to up-link processing module 134 and eFTPE 126, as indicated by the dashed arrows 506 and 507, respectively. Up-link processing module 134 processes the frequency domain decompressed full rate data in a normal manner to provide information to network interface 212. In parallel, eFTPE 126 transforms the frequency domain decompressed full rate data to the time domain utilizing the iFFT module 129, and stores the time domain decompressed full rate data at decompressed full rate buffer 207, as indicated by the dashed arrow 508. RACH module 133 accesses the time domain decompressed full rate data at decompressed full rate buffer 207, as indicated by the dashed arrow 509, for further RACH processing.

This method enables compressed data rates to be utilized for communication over the link between REC 102 and RE 104 for higher link efficiency. This method also allows a CPRI link that is implemented at the CPRI version v4.x specification to be upward compatible with CPRI version v6.x implementations and fully compliant with the CPRI version v6.x specification for these features, and eliminates the need to implement any changes in the REC controller and/or layer 1 processing. Hardware implementations can also be done, though with increased costs associated with buffering and complexity.

Figure 6:
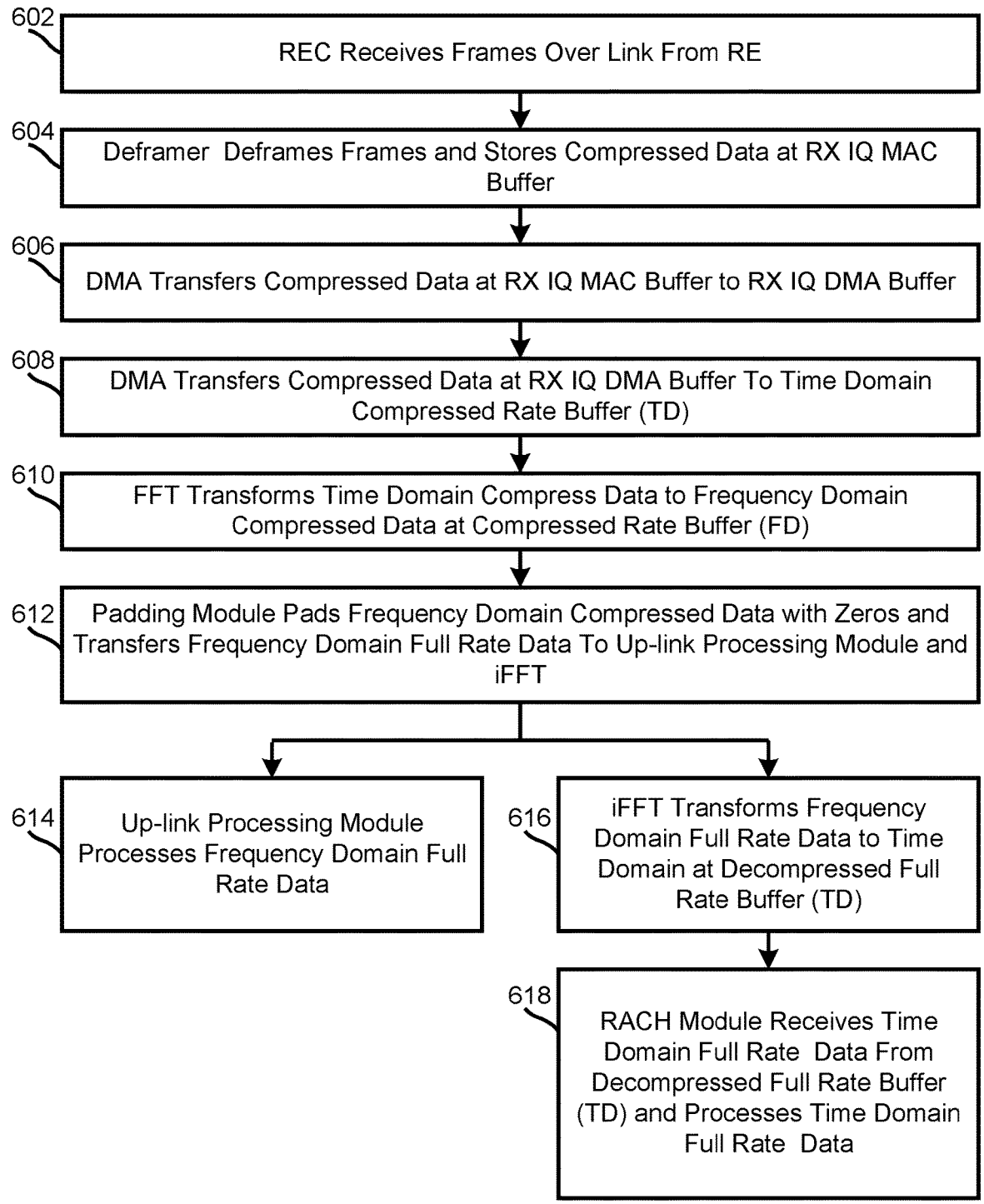
FIG. 6 illustrates a method of data processing by a radio equipment control device in an up-link direction, in accordance with at least one embodiment of the present disclosure.

FIG. 6 illustrates a method 600 of data processing by a radio equipment control (REC) device in an up-link direction, where the exemplary method begins at block 602. At block 602, the REC receives frames of compressed data at the compressed data rate over an interface link from a radio equipment (RE) device in the up-link direction. At block 604, a deframer de-multiplexes the frames of compressed data and stores the de-multiplexed compressed data at a RX IQ MAC buffer. At block 606, a DMA accesses the compressed data at the RX IQ MAC buffer and stores the compressed data at a RX IQ DMA buffer. At block 608, the DMA stores the time domain compressed data at a compressed rate buffer of a memory subsystem. At block 610, an eFTPE accesses the time domain compressed data stored at the compressed rate buffer, transforms the time domain compressed data to the frequency domain utilizing a FFT module 128, and stores the frequency domain compressed data at a compressed rate buffer (FD).

At block 612, a padding module accesses the frequency domain compressed data stored at the compressed rate buffer, transforms the frequency domain compressed data to frequency domain decompressed full rate data by padding the compressed data with zeros, and provides the frequency domain decompressed full rate data to an up-link processing module and the eFTPE. At block 614, the up-link processing module processes the frequency domain decompressed full rate data. At block 616, in parallel, the eFTPE transforms the frequency domain decompressed full rate data to the time domain utilizing an iFFT module, and stores the time domain decompressed full rate data at a decompressed full rate buffer. At block 618, a RACH module accesses the time domain decompressed full rate data at the decompressed full rate buffer for further RACH processing. As such, the method 600 of data processing by the radio equipment control device in the up-link direction has successfully completed.

Figure 7:
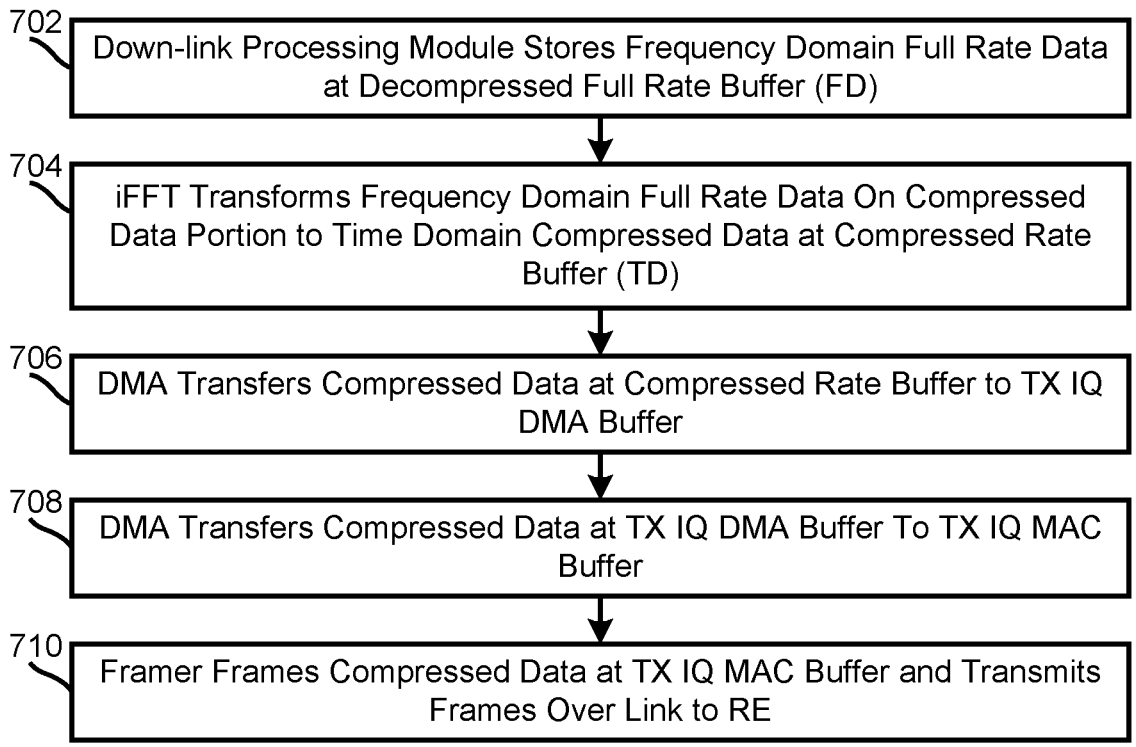
FIG. 7 illustrates a method of data processing by a radio equipment control device in a down-link direction, in accordance with at least one embodiment of the present disclosure.

FIG. 7 illustrates a method 700 of data processing by a radio equipment control (REC) device in a down-link direction, where the exemplary method begins at block 702. At block 702, a down-link processing module stores frequency domain decompressed full rate data at a decompressed full rate buffer (FD). At block 704, an eFTPE accesses the frequency domain decompressed full rate data at the decompressed full rate buffer transforms a portion of the frequency domain decompressed full rate data to the time domain utilizing an iFFT module to generate time domain compressed rate data, and stores the time domain compressed rate data at a time domain compressed rate buffer. At block 706, a DMA accesses the time domain compressed rate data at the time domain compressed rate buffer and stores the time domain compressed rate data at a TX IQ DMA buffer. At block 708, the DMA stores the time domain compressed rate data at a TX IQ MAC buffer of a framer. At block 710, the framer multiplexes the time domain compressed rate data at the TX IQ MAC buffer into frames of time domain compressed rate data and transmits the frames of time domain compressed rate data to a radio equipment (RE) device at the compressed data rate over an interface link in the down-link direction. As such, the method 700 of data processing by the radio equipment control device in the down-link direction has successfully completed.

FIG. 8 illustrates another method 800 of data processing by a radio equipment control (REC) device in an up-link direction similar to method 600 described above, where the exemplary method begins at block 802. At block 802, the REC receives frames of compressed data at the compressed data rate over an interface link from a radio equipment (RE) device in the up-link direction. At block 804, a deframer de-multiplexes the frames of compressed data and stores the de-multiplexed compressed data at a RX IQ MAC buffer. At block 806, a DMA accesses the compressed data at the RX IQ MAC buffer and stores the time domain compressed data at a RX IQ DMA buffer. At block 808, the DMA stores the time domain compressed data at a memory of an eFTPE. At block 810, the eFTPE transforms the time domain compressed data to the frequency domain utilizing a FFT module, and stores the frequency domain compressed data at a compressed rate buffer (FD).

At block 812, a padding module accesses the frequency domain compressed data stored at the compressed rate buffer, transforms the frequency domain compressed data to frequency domain decompressed full rate data by padding the compressed data with zeros, and provides the frequency domain decompressed full rate data to an up-link processing module and the eFTPE. At block 814, the up-link processing module processes the frequency domain decompressed full rate data. At block 816, in parallel, the eFTPE transforms the frequency domain decompressed full rate data to the time domain utilizing an iFFT module, and stores the time domain decompressed full rate data at a decompressed full rate buffer. At block 818, a RACH module accesses the time domain decompressed full rate data at the decompressed full rate buffer for further RACH processing. As such, the method 800 of data processing by the radio equipment control device in the up-link direction has successfully completed.

It will be appreciated that more than one eFTPE can exist and that the iFFT and FFT module of a particular eFTPE can use the same or separate hardware.

It will be appreciated that the devices disclosed herein can be implemented in various manners using various types of memory.

The interconnects disclosed herein are used to communicate information between various modules and devices either directly or indirectly. For example, each of the interconnects can be implemented as a passive device, such as conductive nodes that include one or more conductive traces, that transmits directly between the various modules and devices, or as an active device, where information being transmitted is buffered, for example stored and retrieved, in the process of being communicated between devices, such as at a first-in first-out memory or other memory device. In addition, a label associated with an interconnect can be used herein to refer to a signal and information transmitted by the interconnect.

REC 102 and RE 104 can be provided by, for example, an instruction based digital signal processor, an application specific integrated circuit device, a field programmable gate array (FPGA), a General Purpose Processor (GPP), another type of logic circuit capable of performing operations, the like, and combinations thereof. In an exemplary embodiment, REC 102 represents a digital baseband signal processor and RE 104 represents a digital signal processor.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
receiving, by a radio equipment control (REC) device of a wireless communication system over an interface link, time domain compressed data from a radio equipment (RE) device at a first data transmission rate; and
transforming, by the REC device, the time domain compressed data to frequency domain decompressed full rate data for a second transmission data rate utilizing a Fast Fourier processing engine of the REC device, wherein said transforming comprises
transforming, using the Fast Fourier processing engine, the time-domain compressed data to frequency domain compressed data, and
padding the frequency domain compressed data with zeros to create the frequency domain decompressed full rate data, wherein said padding is performed subsequent to said transforming the time-domain compressed data to frequency domain compressed data;
transforming, by the fast Fourier processing engine, the frequency domain decompressed full rate data to time domain decompressed full rate data; and
processing, by a random access channel (RACH) circuit, the time domain decompressed full rate data.

2. The method of claim 1, further comprising:
processing the frequency domain decompressed full rate data.

3. The method of claim 1, wherein the first data transmission rate is less than the second data transmission rate.

4. The method of claim 1, wherein the interface link comprises one or more of a common public radio interface (CPRI) and an open base station architecture initiative (OBSAI) interface.

5. The method of claim 1, wherein the wireless communication system comprises one or more of a long term evolution (LTE) system, a LTE advanced system, a worldwide interoperability for microwave access (WIMAX) system, a WIMAX advanced system, and a wideband code division multiple access (WCDMA) system.

6. A wireless communication system comprising:
an interface link; and
a radio equipment control (REC) circuit configured to:
receive time domain compressed data over the interface link from a radio equipment (RE) device at a first data transmission rate; and
perform a Fast Fourier transformation using a Fast Fourier processing engine to transform the time domain compressed data to frequency domain compressed data; and
pad the frequency domain compressed data with zeros to create frequency domain decompressed full rate data, wherein padding the frequency domain compressed data is performed subsequent to the fast Fourier transformation;
transform, at the fast Fourier processing engine, the frequency domain decompressed full rate data to time domain decompressed full rate data; and
process, at a random access channel (RACH) circuit, the time domain decompressed full rate data.

7. The wireless communication system of claim 6, wherein an inverse fast Fourier transformation is performed to transform the frequency domain decompressed full rate data to the time domain decompressed full rate data.

8. The wireless communication system of claim 6, wherein the first data transmission rate is less than the second data transmission rate.

* * * * *